US011208911B2

(12) United States Patent
Sadler et al.

(10) Patent No.: US 11,208,911 B2
(45) Date of Patent: Dec. 28, 2021

(54) TURBINE SHROUD RING SEGMENTS WITH CERAMIC MATRIX COMPOSITE COMPONENTS

(71) Applicants: Rolls-Royce plc, London (GB); Rolls-Royce North American Technologies Inc., Indianapolis, IN (US); Rolls-Royce Corporation, Indianapolis, IN (US)

(72) Inventors: Keith Sadler, London (GB); Ted J. Freeman, Danville, IN (US); Aaron D. Sippel, Zionsville, IN (US); Alexandra Baucco, Indianapolis, IN (US)

(73) Assignees: Rolls-Royce plc; Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 16/856,752

(22) Filed: Apr. 23, 2020

(65) Prior Publication Data
US 2021/0332713 A1    Oct. 28, 2021

(51) Int. Cl.
| F01D 11/08 | (2006.01) |
| F01D 25/24 | (2006.01) |
| F01D 9/04 | (2006.01) |
| F01D 11/00 | (2006.01) |

(52) U.S. Cl.
CPC ............ *F01D 11/08* (2013.01); *F01D 25/246* (2013.01); *F01D 9/04* (2013.01); *F01D 11/005* (2013.01); *F05D 2220/323* (2013.01); *F05D 2230/64* (2013.01); *F05D 2240/11* (2013.01); *F05D 2240/12* (2013.01); *F05D 2240/55* (2013.01); *F05D 2260/30* (2013.01); *F05D 2300/6033* (2013.01)

(58) Field of Classification Search
CPC ........ F01D 11/08; F01D 11/005; F01D 25/24; F01D 25/246; F01D 9/04; F05D 2220/323; F05D 2230/64; F05D 2240/11; F05D 2300/6033
See application file for complete search history.

(56) References Cited

U.S. PATENT DOCUMENTS

| 5,368,444 A | 11/1994 | Anderson |
| 6,877,952 B2 | 4/2005 | Wilson |
| 6,884,026 B2 | 4/2005 | Glynn et al. |
| 7,416,362 B2 | 8/2008 | North |

(Continued)

FOREIGN PATENT DOCUMENTS

| FR | 3056632 A1 | 3/2018 |
| FR | 3056636 A1 | 3/2018 |
| FR | 3064024 A1 | 9/2018 |

OTHER PUBLICATIONS

Extended EP Search Report completed by the EPO dated Sep. 9, 2021 and issued in connection with EP Appln. No 21164445.5, 8 pages.

*Primary Examiner* — Woody A Lee, Jr.
*Assistant Examiner* — Maxime M Adjagbe
(74) *Attorney, Agent, or Firm* — Barnes & Thornburg LLP

(57) ABSTRACT

An assembly adapted for use in a gas turbine engine includes a carrier and a blade track segment. The carrier extends at least partway about an axis. The blade track segment is supported by the carrier radially relative to the axis to define a portion of a gas path of the assembly.

20 Claims, 9 Drawing Sheets

(56) References Cited

U.S. PATENT DOCUMENTS

| | | |
|---|---|---|
| 7,563,071 B2 | 7/2009 | Campbell et al. |
| 7,874,059 B2 | 1/2011 | Morrison et al. |
| 9,863,265 B2 | 1/2018 | Stapleton et al. |
| 10,138,750 B2 * | 11/2018 | McCaffrey ................ F01D 5/02 |
| 10,301,960 B2 | 5/2019 | Stapleton et al. |
| 10,378,386 B2 | 8/2019 | Roussille et al. |
| 2017/0016341 A1 * | 1/2017 | Stapleton ................ F01D 9/042 |
| 2018/0051591 A1 | 2/2018 | Quennehen et al. |
| 2018/0073398 A1 | 3/2018 | Quennehen et al. |
| 2018/0087401 A1 * | 3/2018 | Quennehen ............. F01D 11/24 |
| 2019/0107002 A1 * | 4/2019 | Crutchfield ........... F01D 25/246 |

* cited by examiner

TURBINE SHROUD RING SEGMENTS WITH CERAMIC MATRIX COMPOSITE COMPONENTS

FIELD OF DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite materials designed to withstand high temperatures. In some examples, coupling ceramic matrix composite components with traditional arrangements may present problems due to thermal expansion and/or material properties of the ceramic matrix composite components.

SUMMARY

The present disclosure may comprise one or more of the following features and combinations thereof.

A turbine shroud assembly adapted for use in a gas turbine engine may include a carrier, a blade track segment, and an intermediate carrier. The carrier may comprise metallic materials and may be arranged to extend circumferentially at least partway about an axis. The blade track segment may comprise ceramic matrix composite materials. The intermediate carrier may be configured to couple the blade track segment to the carrier.

In some embodiments, the blade track segment may be formed to include a runner, a first mount post, and a second mount post. The runner may be shaped to extend circumferentially partway around the axis. The first mount post may extend radially outward from the runner. The second mount post may extend radially outward from the runner and be spaced apart axially from the first mount post to define a channel therebetween.

In some embodiments, the intermediate carrier may include an intermediate carrier body, at least one pin, and at least one retainer. The intermediate carrier body may be arranged axially between the first mount post and the second mount post. The pin may extend axially into the first mount post, the intermediate carrier body, and the second mount post to couple the intermediate carrier body to the blade track segment. The retainer may extend radially outward from the intermediate carrier body through the carrier to couple the intermediate carrier and the blade track segment with the carrier.

In some embodiments, the carrier may include a carrier body and a plurality of locating pads. The plurality of locating pads may each extend radially inward from the carrier body into contact with a radially-outwardly facing surface of at least one of the first mount post and the second mount post of the blade track segment. The plurality of locating pads may contact the radially-outwardly facing surface to radially locate the blade track segment relative to the carrier.

In some embodiments, the intermediate carrier includes a plurality of retainers. The plurality of retainers may be spaced apart circumferentially along the intermediate carrier body.

In some embodiments, each retainer of the plurality of retainers includes a coupling and a fastener. The coupling may be formed integrally with the intermediate carrier body. The coupling may extend radially outward from the intermediate carrier body. The fastener may extend radially inward through the carrier into the coupling to couple the intermediate carrier with the carrier.

In some embodiments, each retainer of the plurality of retainers includes a threaded shaft and a fastener nut. The threaded shaft may be formed integrally with the intermediate carrier body. The threaded shaft may extend radially outward from the intermediate carrier body through the carrier. The fastener nut may mate with the threaded shaft radially outward of the carrier to couple the intermediate carrier with the carrier.

In some embodiments, the plurality of retainers may include a first retainer, a second retainer, and a third retainer. The first or center retainer may extend outward from the intermediate carrier body along a center retainer axis. The center retainer axis may extend radially relative to the axis of the gas turbine engine. The second retainer may be spaced apart circumferentially from the center retainer and may extend outward from the intermediate carrier body along a second retainer axis. The third retainer may be spaced apart circumferentially from the center retainer opposite the second retainer and may extend outward from the intermediate carrier body along a third retainer axis. The second retainer axis and the third retainer axis may be parallel to the center retainer axis.

In some embodiments, each retainer of the plurality of retainers may extend through one slot included in a plurality of slots formed in the carrier. The plurality of slots may include a first circumferentially-elongated slot, a second circumferentially-elongated slot, and a center slot. The first circumferentially-elongated slot, a second circumferentially-elongated slot, and the center slot may each extend radially through the carrier.

In some embodiments, the second circumferentially-elongated slot may be spaced apart circumferentially from the first circumferentially-elongated slot. The center slot may be located circumferentially between the first circumferentially-elongated slot and the second circumferentially-elongated slot.

In some embodiments, the first and second circumferentially-elongated slots may extend circumferentially at least partway through the carrier. The first and second circumferentially-elongated slots may extend circumferentially at least partway through the carrier to allow the corresponding retainers to move circumferentially relative to the carrier.

In some embodiments, the plurality of slots may include a first circumferentially-elongated slot, a second circumferentially-elongated slot, and an axially-elongated slot. The first circumferentially-elongated slot, the second circumferentially-elongated slot, and the axially-elongated slot may each extend radially through the carrier.

In some embodiments, the second circumferentially-elongated slot may be spaced apart circumferentially from the first circumferentially-elongated slot. The axially-elongated slot may be located circumferentially between the first circumferentially-elongated slot and the second circumferentially-elongated slot.

In some embodiments, the first and second circumferentially-elongated slots may extend circumferentially at least partway through the carrier to allow the corresponding retainers to move circumferentially relative to the carrier. In some embodiments, the axially-elongated slot may extend axially at least partway through the carrier to allow the corresponding retainer to move axially relative to the carrier.

In some embodiments, the carrier body may include an outer wall, a first radial wall, and a second radial wall. The outer radial wall may extend circumferentially partway about the axis. The first radial wall may extend radially inward from the outer wall. The second radial wall may extend radially inward from the outer wall.

In some embodiments, the second radial wall may be spaced apart axially from the first radial wall to define an attachment-receiving space. The attachment-receiving space may be configured to receive the first mount post and the second mount post of the blade track segment.

In some embodiments, the second radial wall may be shaped to include a chordal seal. The chordal seal may extend circumferentially along and axially from the second radial wall. The chordal seal may engage the second mount post of the blade track segment to axially locate the blade track segment.

In some embodiments, the carrier further includes at least one anti-rotation feature. The anti-rotation feature may extend axially from one of the first radial wall and the second radial wall into an anti-rotation notch. The anti-rotation notch may be formed in a corresponding mount post of the blade track segment to block circumferential movement of the blade track segment relative to the carrier.

In some embodiments, the second radial wall may include at least one anti-rotation feature. The anti-rotation feature may extend axially forward from the second radial wall into an anti-rotation notch formed in the second mount post of the blade track segment to block circumferential movement of the blade track segment relative to the carrier.

In some embodiments, the outer wall of the carrier may shaped to include axial orientation tabs. The axial orientation tabs may extend radially inward from a radially-inwardly facing surface of the outer wall. The axial orientation tabs may engage the intermediate carrier on opposite axial sides of the intermediate carrier to axially align the intermediate carrier relative to the carrier so that the intermediate carrier is in a predetermined axial position relative to the carrier.

In some embodiments, the axial orientation tabs may engage at least one retainer included in the intermediate carrier on opposite axial sides of the retainer. The axial orientation tabs may engage the retainer on opposite axial sides to axially align the retainer relative to the carrier so that the intermediate carrier is in a predetermined axial position relative to the carrier.

In some embodiments, the outer wall of the carrier may be shaped to include circumferential orientation tabs. The circumferential orientation tabs may extend radially inward from the radially-inwardly facing surface of the outer shroud wall. The circumferential orientation tabs may engage the intermediate carrier on opposite circumferential ends of the intermediate carrier to circumferentially align the intermediate carrier relative to the carrier so that the intermediate carrier is in a predetermined circumferential position relative to the carrier.

In some embodiments, the turbine shroud assembly may further include a bias member. The bias member may be arranged between the first mount post of the blade track segment and the carrier. The bias member may be configured to bias the blade track segment axially aft.

According to another aspect of the present disclosure, a turbine shroud assembly adapted for use in a gas turbine engine may include a carrier, a blade track segment, and an intermediate carrier body. The carrier may extend at least partway circumferentially around an axis.

In some embodiments, the blade track segment may include a runner and an attachment portion. The runner may be shaped to extend partway around the axis. The attachment portion may extend radially outward from the runner.

In some embodiments, the intermediate carrier may include an intermediate carrier body, a pin, and a first retainer. The pin may extend axially into the attachment portion and the intermediate carrier body to couple the intermediate carrier body to the blade track segment. The first retainer may extend through the carrier to couple the intermediate carrier and the blade segment to the carrier.

In some embodiments, the carrier may include a carrier body and a locating pad. The locating pad may extend radially inward from the carrier body into contact with a radially-outwardly facing surface of the attachment portion of the blade track segment. The locating pad may contact the radially-outwardly facing surface to radially locate the blade track segment relative to the carrier.

In some embodiments, the first retainer may include a coupling and a fastener. The coupling may extend radially outward from the intermediate carrier body. The fastener may extend radially inward through the carrier into the coupling to couple the intermediate carrier with the carrier.

In some embodiments, the first retainer may include a shaft and a fastener nut. The shaft may extend radially outward from the intermediate carrier body through the carrier. The fastener nut may mate with the shaft radially outward of the carrier to couple the intermediate carrier with the carrier.

In some embodiments, the carrier may include an outer wall, a first radial wall, and a second radial wall. The outer wall may extend circumferentially partway about the axis. The first radial wall may extend radially inward from the outer wall. The second radial wall may extend radially inward from the outer wall. In some embodiments, the second radial wall may be spaced apart axially from the first radial wall to define an attachment-receiving space.

In some embodiments, the second radial wall may be shaped to include a chordal seal. The chordal seal may extend circumferentially along and axially from the second radial wall. The chordal seal may engage the attachment portion of the blade track segment to axially locate the blade track segment.

In some embodiments, the outer wall of the carrier segment may be shaped to include orientation tabs. The orientation tabs may extend radially inward from a radially-inwardly facing surface of the outer wall. The orientation tabs may engage the intermediate carrier on opposite sides of the intermediate carrier to align the intermediate carrier with the carrier segment.

In some embodiments, the turbine shroud assembly may further include a bias member. The bias member may be arranged between the attachment portion of the blade track segment and the carrier. The bias member may be configured to bias the blade track segment axially aft.

According to another aspect of the present disclosure, a method may include providing a carrier, a blade track segment, and an intermediate carrier. The intermediate carrier may be configured to couple the blade track segment to the carrier.

In some embodiments, the blade track segment may include a runner, a first mount post, and a second mount post. The runner may be shaped to extend partway around an axis. The first mount post may extend radially outward from the runner. The second mount post may be spaced apart axially from the first mount post that extends radially outward from the runner. In some embodiments, the intermediate carrier may include an intermediate carrier body, a pin, and a retainer.

In some embodiments, the method may further include arranging the intermediate carrier axially between the first mount post and the second mount post. The intermediate carrier may be arranged axially between the first and second mount posts so that a pin hole formed in the intermediate carrier aligns circumferentially with a pin hole in the first mount post and a pin hole in the second mount post.

In some embodiments, the method may further include inserting the pin through the pin hole formed in the first mount post, the pin hole formed in the intermediate carrier, and the pin hole formed in the second mount post. The pin may be inserted to couple the blade track segment to the intermediate carrier body.

In some embodiments, the method may further include arranging the intermediate carrier in an attachment space formed in the carrier. In some embodiments, the method may further include coupling the retainer of the intermediate carrier with the carrier.

These and other features of the present disclosure will become more apparent from the following description of the illustrative embodiments.

DETAILED DESCRIPTION OF THE DRAWINGS

Figure 1:
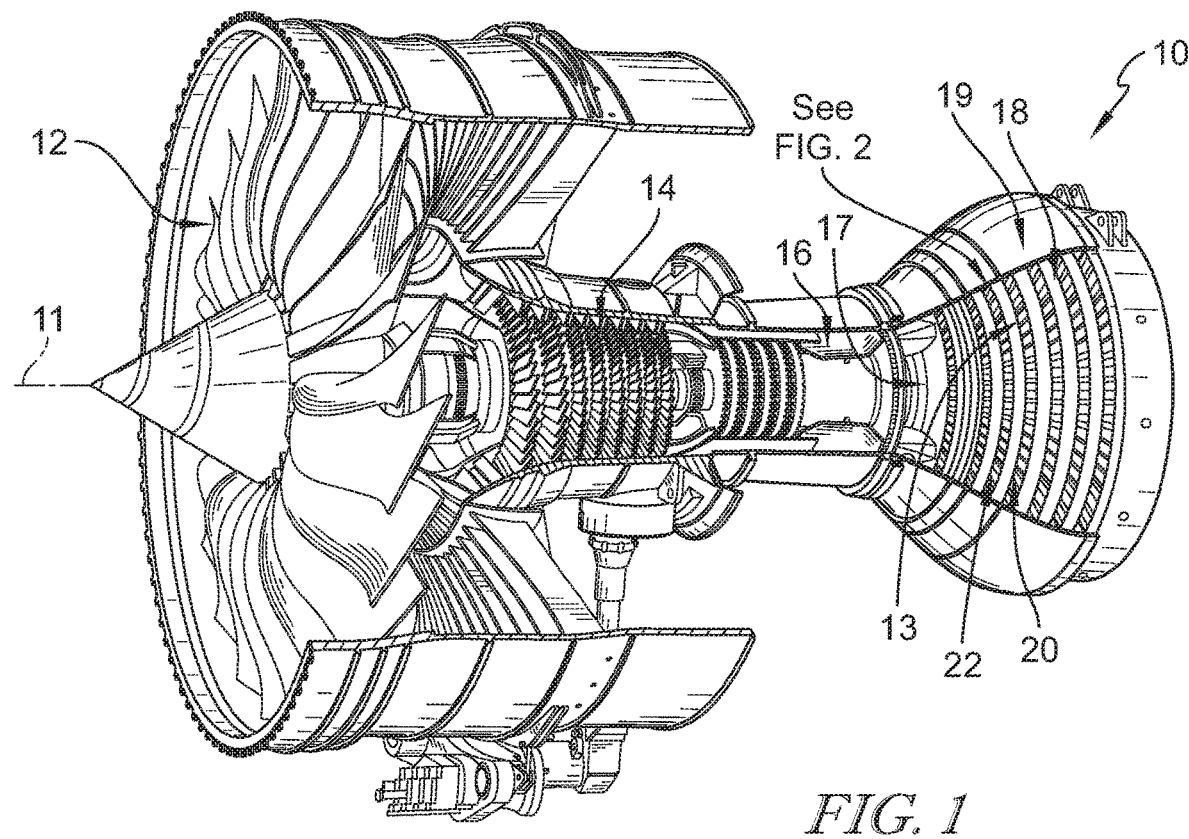
FIG. 1 is a cut-away perspective view of a gas turbine engine showing that the exemplary engine includes a fan, a compressor, a combustor, and a turbine and suggesting that the turbine includes turbine wheel assemblies and static vane assemblies surrounded by a turbine shroud assembly.

For the purposes of promoting an understanding of the principles of the disclosure, reference will now be made to a number of illustrative embodiments illustrated in the drawings and specific language will be used to describe the same.

A turbine shroud segment 22 adapted for use in a gas turbine engine 10 is shown in FIGS. 2-7. The turbine shroud segment 22 includes a carrier 24, a blade track segment 26, and an intermediate carrier 28 configured to couple the blade track segment 26 to the carrier 24 as shown in FIGS. 2-7. The carrier 24 is a metallic support component configured to interface with other metallic components of the gas turbine engine 10. The blade track segment 26 is a ceramic matrix composite component configured to directly face the high temperatures of a gas path 17 of the gas turbine engine 10. The intermediate carrier 28 is designed to engage the blade track segment 26 so as to couple the blade track segment 26 to the carrier 24 and distribute mounting of the blade track segment 26 to the carrier 24.

The intermediate carrier 28 includes an intermediate carrier body 30, at least one pin, illustratively two pins 32, 34, and a plurality of retainers 36 as shown in FIGS. 2-7. The intermediate carrier body 30 is arranged adjacent to an attachment portion of the blade track segment 26. The pins 32, 34 extend axially through the attachment portion 66 of the blade track segment 26 and the intermediate carrier body 30 to couple the blade track segment 26 to the intermediate carrier body 30. Each of the retainers 36 extends outward from the intermediate carrier body 30 to the carrier 24 and engages the carrier 24 to couple the intermediate carrier 28 to the carrier 24.

The intermediate carrier 28 provides an attachment for coupling the blade track segment 26 to the carrier 24 that accommodates the surface tolerance of the ceramic matrix composite materials, while minimizing stress in the blade track segment 26 and minimizing leakage paths in the overall assembly 20. The intermediate carrier 28 eliminates additional attachment mechanisms that may reduce the overall stack of the assembly 20 from the carrier 24 to the gas path 17. Further, by having axial pins 32, 34 and radial retainers 36, the number of leakage paths between the blade track segment 26 and the carrier 24 may be reduced.

Turning again to the gas turbine engine 10, the illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

Figure 2:
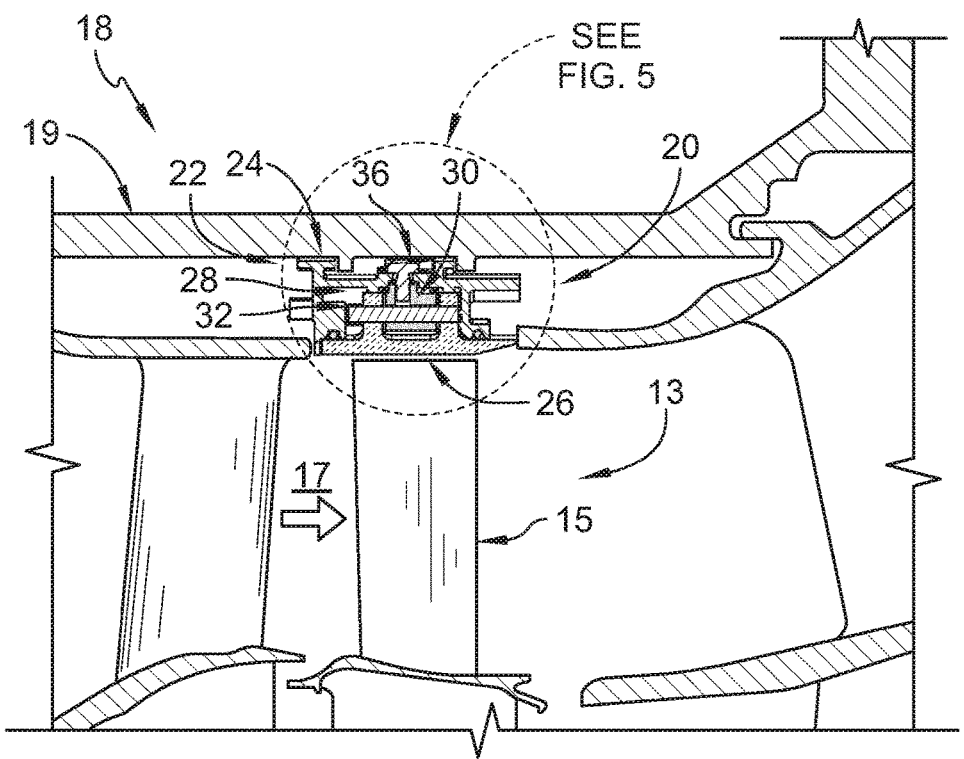
FIG. 2 is a partial cross-sectional view of the gas turbine engine of FIG. 1 showing a portion of the turbine in which the turbine shroud assembly is located radially outward from blades of a turbine wheel assembly to block gasses from passing over the blades without interacting with the blades.
Figure 3:
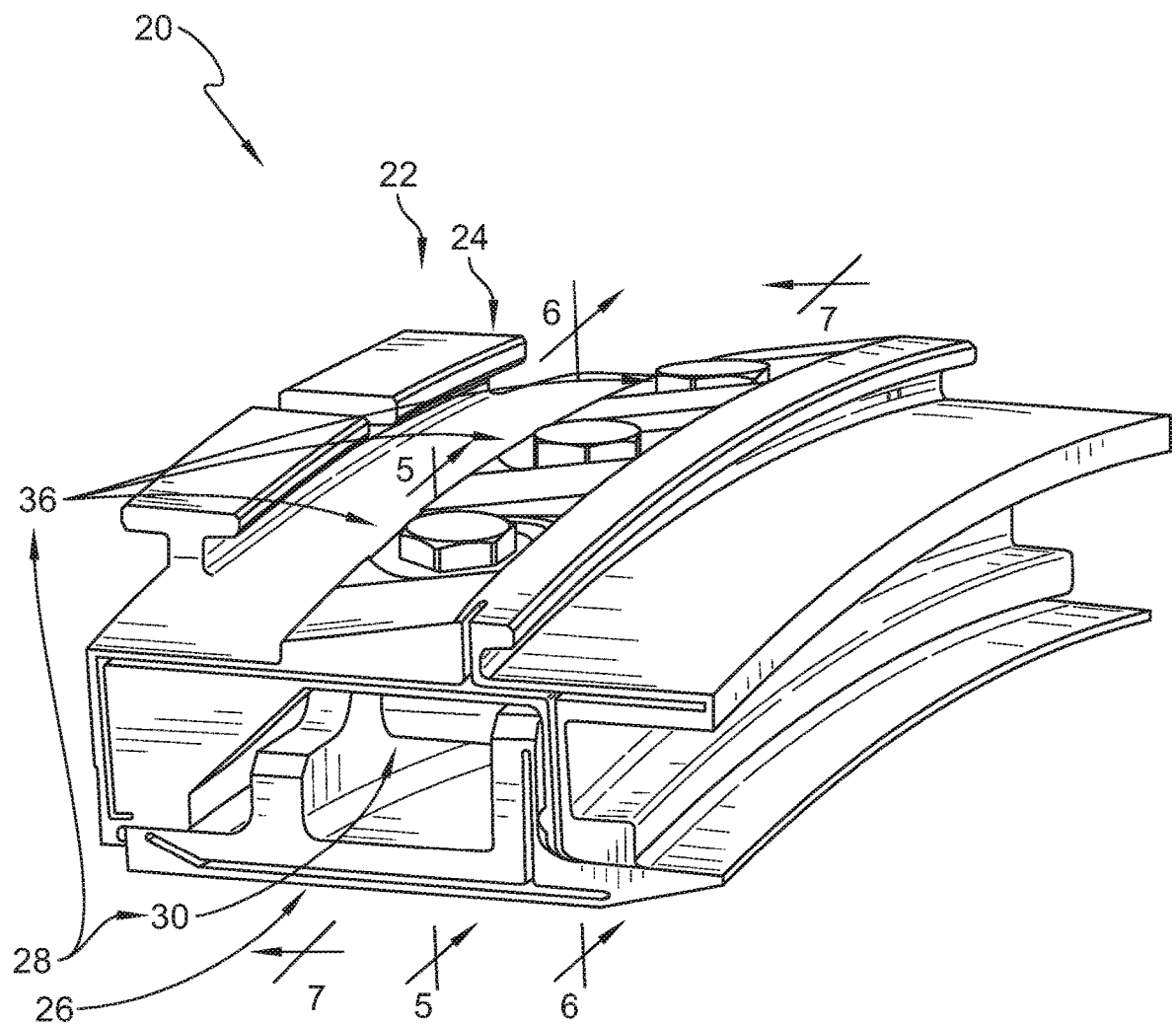
FIG. 3 is a perspective view of a portion of the turbine shroud assembly of FIG. 2 showing the turbine shroud assembly includes a carrier, a blade track segment made from ceramic matrix composite materials, and an intermediate carrier for coupling the blade track segment to the carrier.

The turbine 18 includes at least one turbine wheel assembly 13 and a turbine shroud assembly 20 positioned to surround the turbine wheel assembly 13 as shown in FIGS. 1 and 2. The turbine shroud assembly 20 is coupled to a case 19 of the gas turbine engine 10. The turbine wheel assembly 13 includes a plurality of blades 15 coupled to a rotor disk for rotation therewith. The hot, high pressure combustion products from the combustor 16 are directed toward the blades 15 of the turbine wheel assemblies 13 along the gas path 17. The blades 15 are in turn pushed by the combustion products to cause the turbine wheel assembly 13 to rotate; thereby, driving the rotating components of the compressor 14 and/or the fan 12.

The turbine shroud assembly 20 extends around the turbine wheel assembly 13 to block combustion products from passing over the blades 15 without pushing the blades 15 to rotate as suggested in FIG. 2. In the illustrative embodiment, the turbine shroud assembly 20 is made up of a number of shroud segments 22, one of which is shown in FIGS. 3-7, that extend only partway around the central axis 11 and cooperate to surround the turbine wheel assembly 13. The shroud segments 22 are sealed against one another, such as by strip seal members, to provide a continuous turbine shroud assembly 20.

Each shroud segment 22 includes the carrier 24, the blade track segment 26, and the intermediate carrier 28 as shown in FIGS. 2-7. In other embodiments, the turbine shroud assembly 20 is annular and non-segmented to extend fully around the central axis 11 and surround the turbine wheel assembly 13. In yet other embodiments, certain components of the turbine shroud assembly 20 are segmented while other components are annular and non-segmented.

The carrier 24 included in each shroud segment 22 is coupled to the case 19 of the engine 10 as shown in FIG. 2. In the illustrative embodiment, the carrier 24 is segmented, while in other embodiments, the carrier 24 may be a full hoop and extend about the axis 11.

Each carrier segment 24 illustratively includes a carrier body 38, a plurality of locating pads 40, 42, and a plurality of orientation features 44, 45, 46, 47 as shown in FIGS. 4-7. The carrier body 38 extends partway around the axis 11 and is shaped to form an attachment-receiving space 39. The plurality of locating pads 40, 42 each extend radially inward from the carrier body 38 into contact with a radially-outwardly facing surface 74 of the attachment portion 66 of the blade track segment 26 to radially locate the blade track segment 26 relative to the carrier 24. The orientation features 44, 45, 46, 47 extend radially inward from the carrier body 38 and engage the intermediate carrier 28 to axially and circumferentially orientate the intermediate carrier 28 relative to the carrier 24.

The carrier body 38 includes an outer wall 48, hangers 50, and fore and aft radial walls 52, 54 as shown in FIGS. 4-7. The outer wall 48 extends circumferentially partway about the axis 11 and is shaped to include through holes 49 that receive a portion of the retainers 36. The hangers 50 extend radially outward from the outer wall 48 and engage the case 19 to couple the turbine shroud segment 22 to the rest of the engine 10. Each of the fore and aft radial walls 52, 54 extend radially inward from the outer wall 48 on opposite axial ends of the outer wall 48. The aft radial wall 54 is spaced apart axially from the fore radial wall 52 to define the attachment-receiving space 39 therebetween that receives the attachment portion 66 of the blade track segment 26.

The fore radial wall 52 is shaped to include axial pin locators 56 and stiffness features 58 as shown in FIGS. 4-7. The axial pin locators 56 extend axially aft from the fore radial wall 52 to block axial movement of the corresponding pin 32, 34 relative to the blade track segment 26. The stiffness features 58 extend axially aft from the fore radial wall 52 and are configured to add stiffness to the carrier 24. The stiffness features 58 may also be configured to transfer loads from a forward vane assembly (not shown) to the case 19 in some embodiments.

In the illustrative embodiments, the attachment portion 66 of the blade track segment 26 forms a notch 76. The notch 76 is sized to allow space for the stiffness feature 58. In some embodiments, the stiffness feature 58 may act as an anti-rotation feature extending into the notch 76 to block circumferential movement of the blade track segment 26 relative to the carrier 24.

The aft radial wall 54 is shaped to include axial pin locators 60, an anti-rotation feature 61, and a chordal seal 62 as shown in FIGS. 4-7. The axial pin locators 60 extend axially forward from the aft radial wall 54 to block axial movement of the corresponding pin 32, 34 relative to the blade track segment 26. The anti-rotation feature 61 extends axially forward from the aft radial wall 54 into a notch 77 formed in the attachment portion 66 of the blade track segment 26 to block circumferential movement of the blade track segment 26 relative to the carrier 24. The chordal seal 62 extends axially forward from the aft radial wall 54 and engages the attachment portion 66 of the blade track segment 26 to axially locate the blade track segment 26 relative to the carrier 24. In the illustrative embodiment, the chordal seal 62 is spaced radially inward from the axial pin locators 60.

Figure 4:
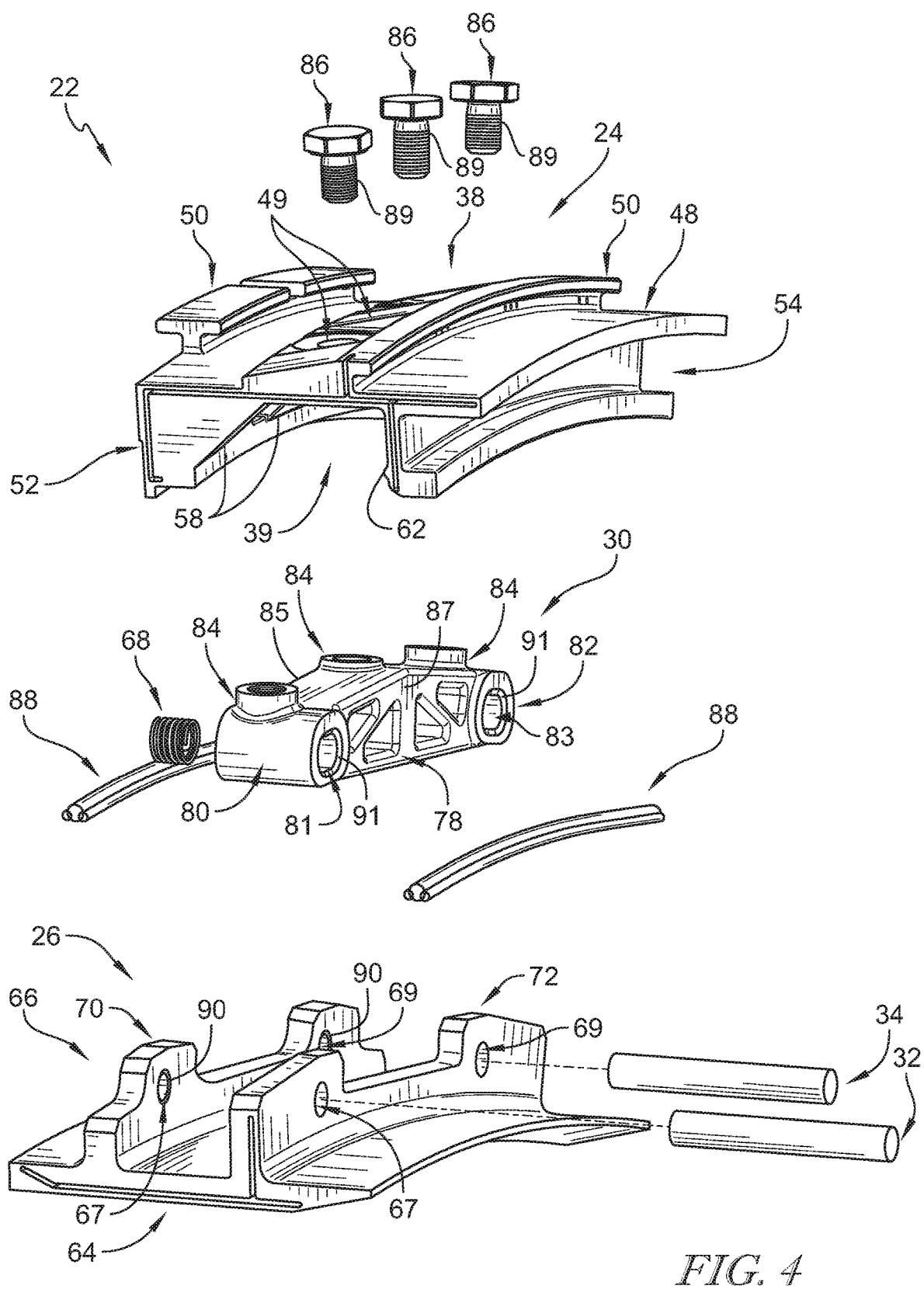
FIG. 4 is an exploded view of the turbine shroud assembly of FIG. 3 showing, from top to bottom, the carrier, the intermediate carrier, and the blade track segment, and showing that the intermediate carrier includes an intermediate carrier body, a plurality of pins configured to axially extend through the blade track segment and the intermediate carrier body, and retainers that extend radially through the carrier to couple the intermediate carrier to the carrier.
Figure 5:
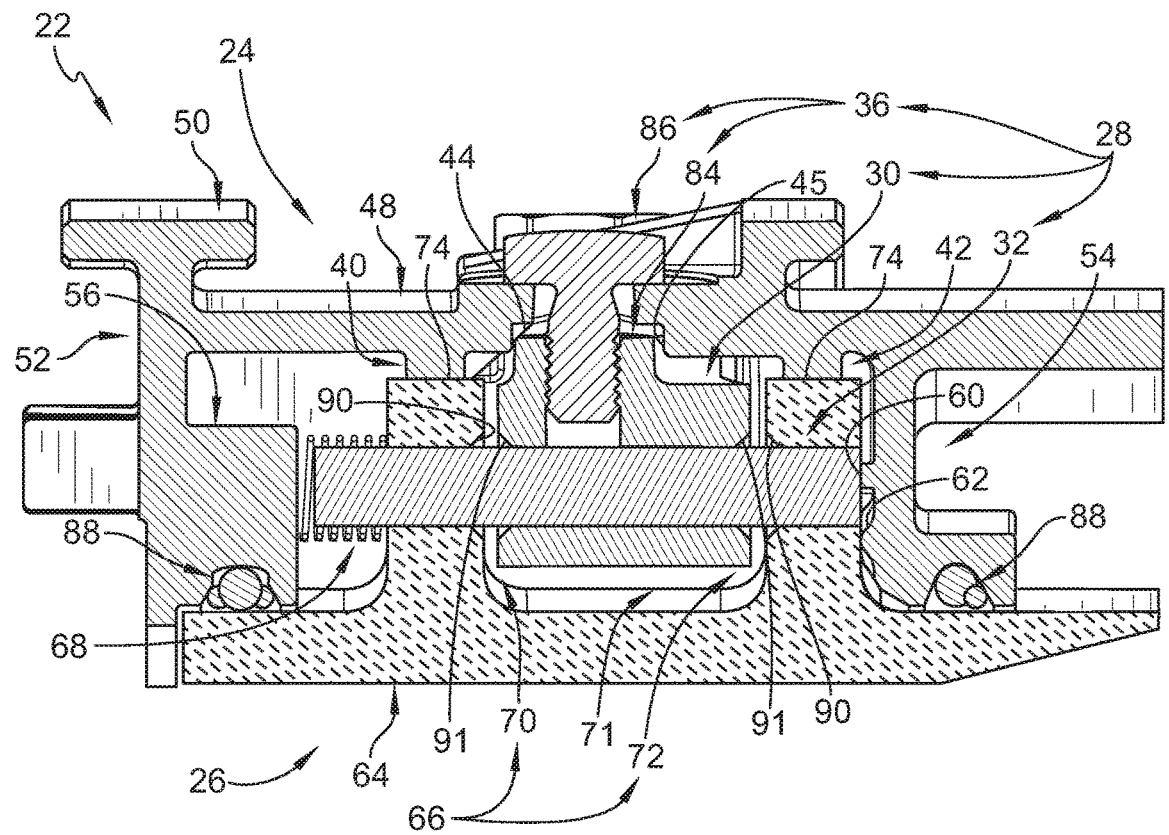
FIG. 5 is a cross-sectional view of the turbine shroud assembly of FIG. 3 taken along line 5-5 showing the turbine shroud assembly further includes a bias member arranged axially between the carrier and the blade track segment to bias the blade track segment axially aft against a chordal seal formed in the carrier.
Figure 6:
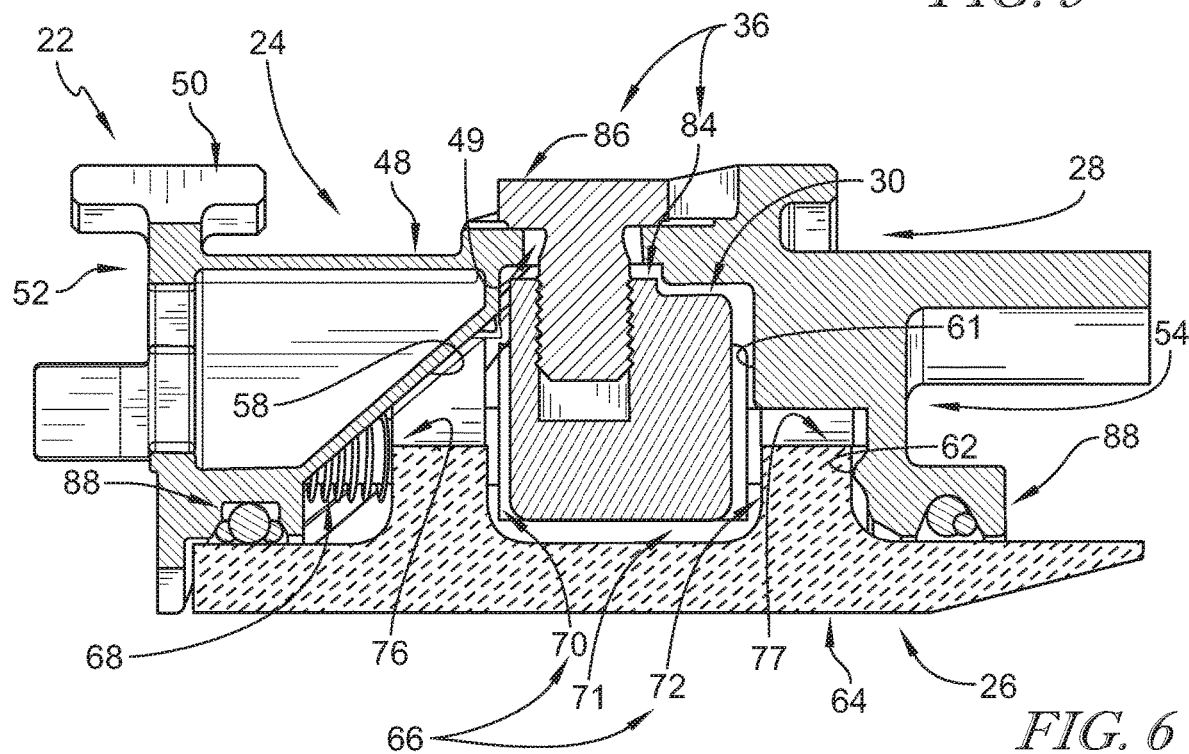
FIG. 6 is a cross-sectional view of the turbine shroud assembly of FIG. 3 taken along line 6-6 showing the carrier includes anti-rotation features that extend into anti-rotation notches formed in the blade track segment to block circumferential movement of the blade track segment relative to the carrier.

In the illustrative embodiment, the attachment-receiving space 39 of the carrier 24 is pressurized such that the pressure biases the attachment portion 66 of the blade track segment 26 axially aft against the chordal seal 62. To aid in the axial location of the attachment portion 66 of the blade track segment 26 on the chordal seal 62, the turbine shroud segment 22 further includes a bias member 68 as shown in FIGS. 4-6. The bias member 68 is arranged between the attachment portion 66 of the blade track segment 26 and the fore radial wall 52 of the carrier 24 and configured to bias the blade track segment 26 axially aft against the chordal seal 62.

In the illustrative embodiment, the turbine shroud segment 22 further includes a plurality of seals 88 as shown in FIGS. 4-6. The seals 88 may be tandem seals 88 that are arranged in channels formed in the fore and aft radial walls 52, 54 of the carrier 24. The seals 88 are configured to engage the runner 64 of the blade track segment 26 to seal the attachment-receiving space 39. In this way, the attachment-receiving space 39 may be pressurized.

The blade track segment 26 of each shroud segment 22 comprises ceramic matrix composite materials as suggested in FIGS. 2 and 5-7. The blade track segment 26 is held in place adjacent to tips of blades 15 to block combustion products from passing over the blades 15 without pushing the blades 15 to rotate.

The blade track segment 26 is illustratively formed to include a runner 64 and the attachment portion 66 as shown in FIGS. 4-7. The runner 64 is arcuate and extends partway around axis 11 adjacent to blades 15. The attachment portion 66 extends radially outward from the runner 64 to provide structure for coupling the blade track segment 26 to the carrier 24.

In the illustrative embodiment, the attachment portion 66 includes a first mount post 70 and a second mount post 72 as shown in FIGS. 4-7. Each mount post 70, 72 extends radially outward from the runner 64. The second mount post 72 is spaced apart axially from the first mount post 70 to define a channel 71 therebetween. In other embodiments, the attachment 66 may be provided by L-shaped hangers, fir-tree shaped members, dovetail members, box shape panels, or other suitable features.

In the illustrative embodiment, the intermediate carrier body 30 is located in the channel 71 axially between the first mount post 70 and the second mount post 72 as shown in FIG. 5. Each of the pins 32, 34 extends axially through the first mount post 70, the intermediate carrier body 30, and the second mount post 72. The locating pads 40, 42 of the carrier 24 engage at least one of the radially-outwardly facing surface 74 of the first mount post 70 and the second mount post 72.

In the illustrative embodiment, the locating pads 40, 42 are spaced apart axially as shown in FIG. 5. One locating pad 40 engages the radially-outwardly facing surface 74 of the first mount post 70 and another locating pad 42 engages the radially-outwardly facing surface 74 of the second mount post 72.

Each of the first mount post 70 and the second mount 72 is shaped to include the respective notches 76, 77 as shown in FIG. 6. The notches 76, 77 receive the corresponding features 58, 61 formed in the carrier 24.

Figure 7:
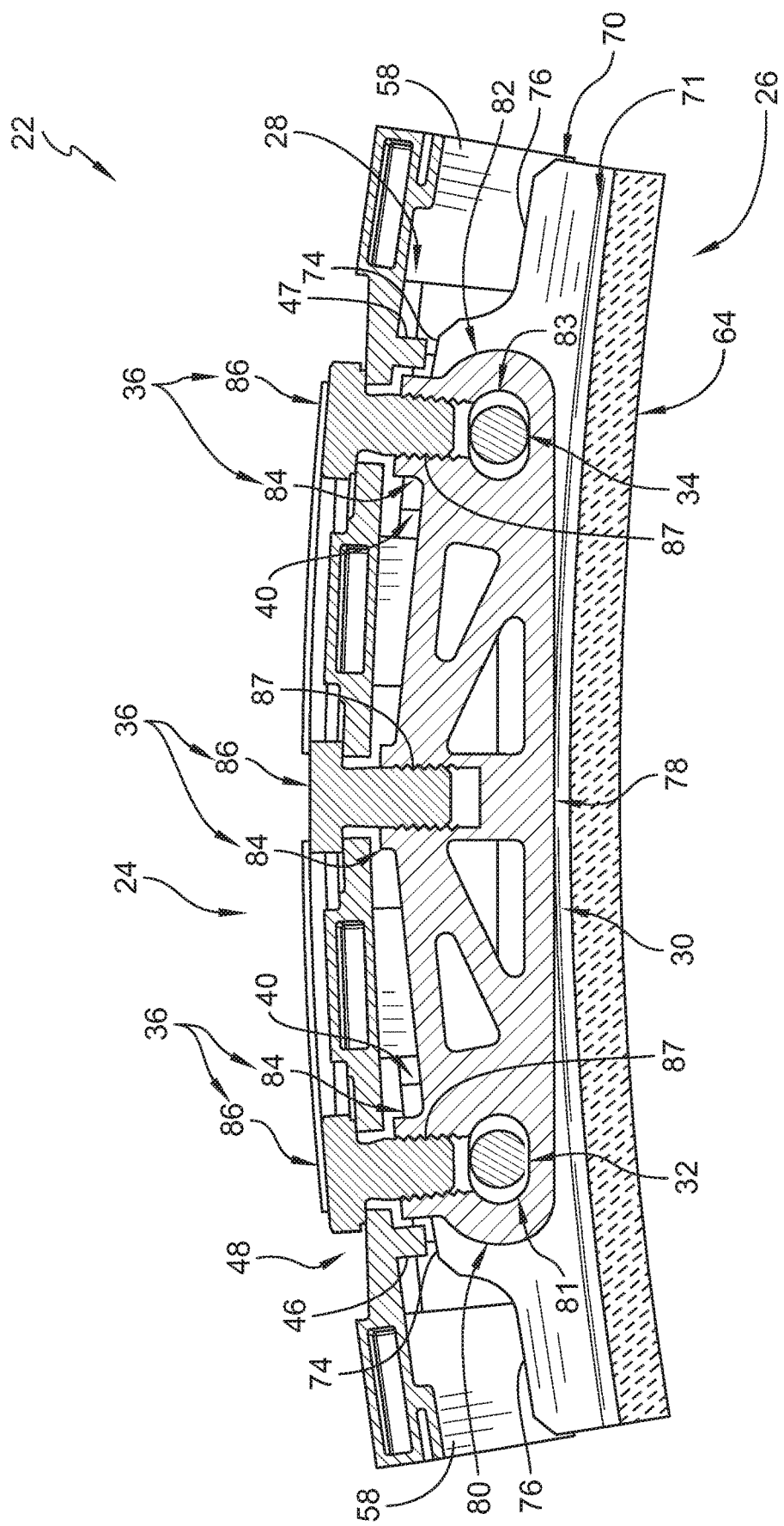
FIG. 7 is a cross-sectional view of the turbine shroud assembly of FIG. 3 taken along line 7-7 showing the retainers extend radially through the carrier to couple the intermediate carrier with the carrier segment.

In the illustrative embodiment, the carrier 24 includes at least two locating pads 40 that engage the first mount post 70 and at least two locating pads 42 that engage the second mount post 72. The two locating pads 40 are spaced apart circumferentially such that the locating pads 40 engage the first mount post 70 on either side of the notch 76 and contact the attachment portion 66 at two circumferential locations as shown in FIG. 7. The locating pads 42 are spaced apart circumferentially such that the locating pads 42 engage the second mount post 72 on either side of the notch 77.

The intermediate carrier body 30 is shaped to include pin holes 81, 83 on circumferential ends 80, 82 of the intermediate carrier body 30 as shown in FIGS. 4 and 7. The first pin hole 81 extends axially through the intermediate carrier body 30 on a first circumferential end 80 of the intermediate carrier body 30. The second pin hole 83 extends axially through the intermediate carrier body 30 on a second circumferential end 82 of the intermediate carrier body 30 opposite the first circumferential end 80.

In the illustrative embodiment, the pin holes 81, 83 are (race track) elongated holes. The race track shape of the pin holes 81, 83 may help reduce stress in the ceramic matrix composite blade track segment 26. The anti-rotation feature 61 is then used to circumferentially locate the blade track segment 26 relative to the intermediate carrier 28.

In the illustrative embodiment, each of the first mount post 70 and the second mount post 72 are also shaped to include corresponding pin holes 67, 69 as shown in FIGS. 4 and 7. The first pin hole 67 extends axially through the first mount post 70 and is axially aligned with the first pin hole 67 that extends axially through the second mount post 72. The second pin holes 69 is spaced apart circumferentially from the first pin hole 67. The second pin hole 69 extends axially through the first mount post 70 and is axially aligned with the second pin hole 69 that extends axially through the second mount post 72.

The first pin 32 extends axially through the first pin hole 67 formed in the first mount post 70, the first pin hole 81 of the intermediate carrier body 30, and the first pin hole 67 formed in the second mount post 72 to couple the blade track segment 26 to the intermediate carrier body 30. In the illustrative embodiment, the second pin 34 extends axially through the second pin hole 69 formed in the first mount post 70, the second pin hole 83 of the intermediate carrier body 30, and the second pin hole 69 formed in the second mount post 72 to couple the blade track segment 26 to the intermediate carrier body 30.

In the illustrative embodiment, each of the pin holes 67, 69, 81, 83 formed in the blade track segment 26 and intermediate carrier body 30 respectively have chamfers 90, 91 on the edges of the holes 67, 69, 81, 83 as shown in FIGS. 4 and 5. The holes 67, 69 in the blade track segment 26 have chamfers 90 and the holes 81, 83 in the intermediate carrier body 30 have chamfers 91. The chamfers 90, 91 help reduce stress in the pins 32, 34 as well as the blade track segment 26. In other embodiments, the shape of the pins 32, 34 may be altered to reduce stress in the pins 32, 34.

Each of the retainers 36 each include a coupling 84 and a fastener 86 as shown in FIGS. 4-7. The coupling 84 is integrally formed with the intermediate carrier body 30 and extends radially outward from the intermediate carrier body 30. The fastener 86 extends radially inward through the corresponding hole 49 formed in the outer wall 48 into the corresponding coupling 84. The fasteners 86 have threads 89 that mate with corresponding threads formed in the coupling 84 to couple the intermediate carrier 28 with the assembled blade track segment 26 to the carrier 24. The fasteners 86 may be tightened to bring the radially-outwardly facing surface 74 of the mount posts 70, 72 into contact with the locating pads 40, 42 of the carrier 24.

In the illustrative embodiment, the intermediate carrier body 30 includes at least three retainers 36 as shown in FIGS. 4 and 7. One retainer 36 extends radially outward from the intermediate carrier body 30 at a center 78 of the intermediate carrier body 30. The other two retainers 36 are located at opposite circumferential ends 80, 82 of the intermediate carrier body 30.

The axial orientation tabs 44, 45 formed in the outer wall 48 of the carrier body 38 are configured to engage the intermediate carrier 28 on opposite axial sides 85, 87 as shown in FIGS. 4 and 5. The axial orientation tabs 44, 45 are configured to axially align intermediate carrier 28 relative to the carrier 24 so that the intermediate carrier 28 is in a predetermined axial position relative to the carrier 24.

In the illustrative embodiment, the axial orientation tabs 44, 45 engage the coupling 84 of the corresponding retainer 36 on the opposite axial sides 85, 87 as shown in FIGS. 4 and 5. One axial orientation tab 44 engages the fore side 85 of the coupling 84, while the other axial orientation tab 45 engages the aft side 87 of the coupling 84. The axial orientation tabs 44, 45 are configured to axially orientate the intermediate carrier 28 relative to the carrier 24.

The circumferential orientation tabs 46, 47 formed in the outer wall 48 of the carrier body 38 are configured to engage the coupling 84 of the corresponding retainer 36 at the opposite circumferential ends 80, 82 of the intermediate carrier body 30 as shown in FIG. 7. One circumferential orientation tab 46 engages the first circumferential end 80 of the intermediate carrier body 30, while the other circumferential orientation tab 47 engages the second circumferential end 82 of the intermediate carrier body 30. The circumferential orientation tabs 46, 47 are configured to circumferentially orientate the intermediate carrier body 30 relative to the carrier 24.

A method of assembling the turbine shroud segment 22 includes several steps. The method begins by arranging the intermediate carrier body 30 axially between the first mount post 70 and the second mount post 72. The intermediate carrier body 30 is arranged in the channel 71 such that the pin holes 81, 83 formed in the intermediate carrier body 30 align circumferentially with the pin holes 67, 69 in both the first mount post 70 and the second mount post 72.

After arranging the intermediate carrier body 30 between the mount posts, 70, 72, one of the pins 32 is inserted through the corresponding pin hole 67 formed in the first mount post 70, the corresponding pin hole 81 formed in the intermediate carrier body 30, and the corresponding pin hole 67 formed in the second mount post 72 to couple the blade track segment 26 to the intermediate carrier body 30. This step is repeated for the other pin 34 such that the pin 34 extends through the corresponding pin hole 69 formed in the first mount post 70, the corresponding pin hole 83 formed in the intermediate carrier body 30, and the corresponding pin hole 69 formed in the second mount post 72.

In some embodiments, after the pins 32, 34 are inserted into the blade track segment 26 and intermediate carrier body 30 to couple the components 26, 30 together, the bias member 68 is arranged on one end of the pin 32, 34 before the assembled components 26, 30 are arranged in the attachment-receiving space 39 of the carrier 24.

With the intermediate carrier body 30 assembled with the blade track segment 26, the assembled components are arranged in the attachment-receiving space 39 formed in the carrier 24. The assembled blade track segment 26 and intermediate carrier 28 are arranged such that the holes 49 in the carrier 24 align with the couplings 84. The assembled blade track segment 26 and intermediate carrier 28 may also be arranged so that the bias member 68 engages the corresponding axial pin locator 56.

In some embodiments, before the assembled blade track segment 26 and intermediate carrier body 30 are arranged in the attachment-receiving space 39, the method includes arranging the seals 88 in channels formed in the fore and aft radial walls 52, 54 of the carrier 24. As the assembled blade track segment 26 and intermediate carrier body 30 are arranged in the attachment-receiving space 39, the seals 88 engage the runner 64 of the blade track segment 26 to seal the attachment-receiving space 39.

Once the couplings 84 are aligned with the corresponding holes 49 formed in the carrier 24, the retainer 36 of the intermediate carrier 28 is coupled with the carrier 24. The retainer 36 is coupled with the carrier 24 by inserting the fasteners 86 through the holes 49 in the carrier 24 and into the respective coupling 84. The fasteners 86 are then tightened to bring the radially-outwardly facing surface 74 of both mount posts 70, 72 into contact with the locating pads 40, 42. In the illustrative embodiment, the orientation features 44, 45, 46, 47 help guide the intermediate carrier body 30 to the correct position so that the locating pads 40, 42 contact the surface 74 of the blade track segment 26 in the correct position.

Figure 8:
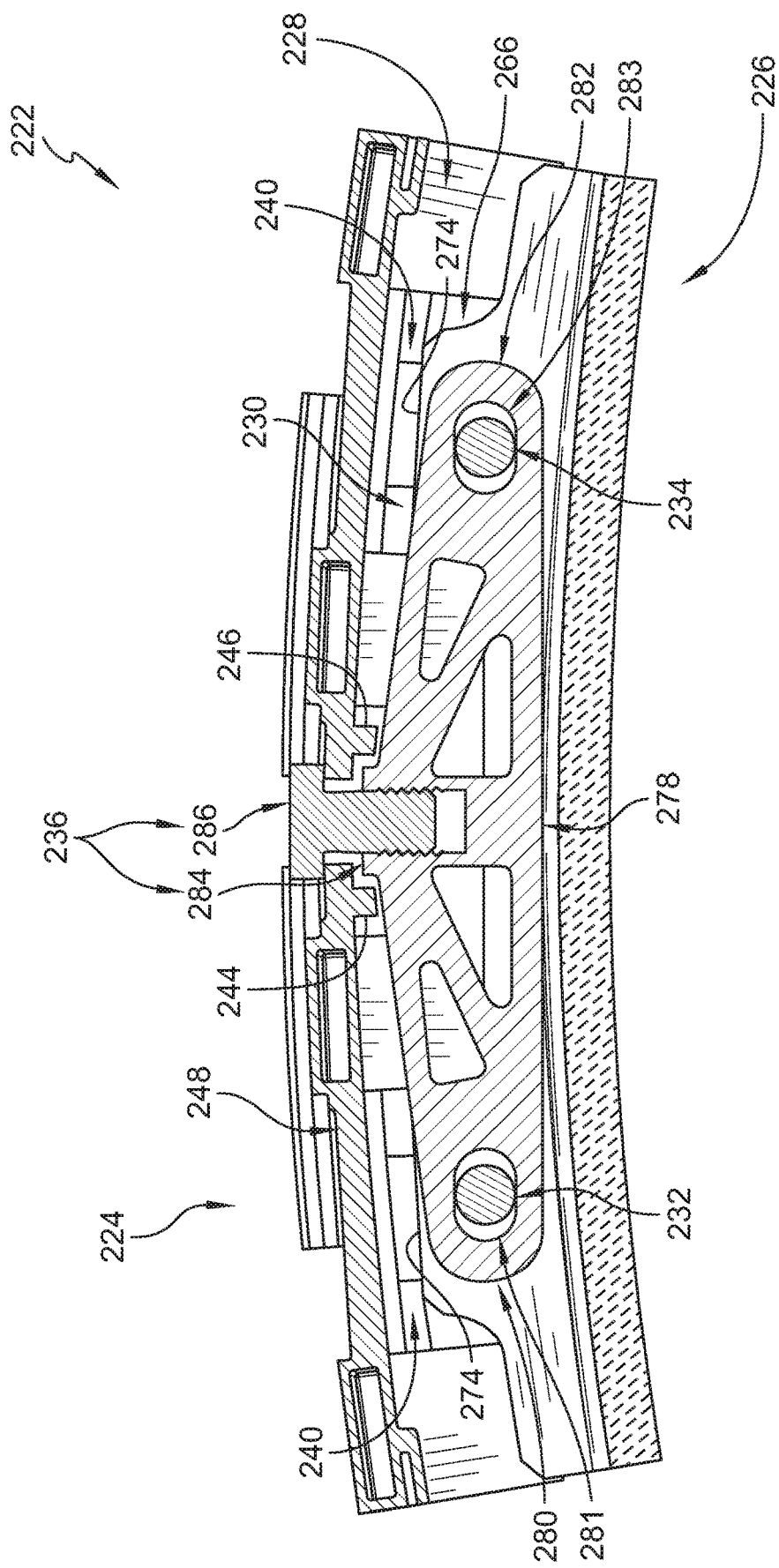
FIG. 8 is a cross-sectional view of another embodiment of a turbine shroud assembly adapted for use in the gas turbine engine of FIG. 1 showing the intermediate carrier includes an intermediate carrier body and a single retainer that extends radially outward from a center of the intermediate carrier body to couple the intermediate carrier with the carrier.

Another embodiment of a turbine shroud segment 222 in accordance with the present disclosure is shown in FIG. 8. The turbine shroud segment 222 is substantially similar to the turbine shroud segment 22 shown in FIGS. 1-7 and described herein. Accordingly, similar reference numbers in the 200 series indicate features that are common between the turbine shroud segment 22 and the turbine shroud segment 222. The description of the turbine shroud segment 22 is incorporated by reference to apply to the turbine shroud segment 222, except in instances when it conflicts with the specific description and the drawings of the turbine shroud segment 222.

The turbine shroud segment 222 includes a carrier 224, a blade track segment 226, and an intermediate carrier 228 as shown in FIG. 8. The intermediate carrier 228 is configured to couple the blade track segment 226 to the carrier 224.

The intermediate carrier 228 includes an intermediate carrier body 230, two pins 232, 234, and a single retainer 236 as shown in FIG. 8. The intermediate carrier body 230 is arranged axially between the attachment portion 266 of the blade track segment 226. The pins 232, 234 extend axially through the attachment portion 266 of the blade track segment 226 and the intermediate carrier body 230 to couple the blade track segment 226 to the intermediate carrier body 230. The retainer 236 extends outward from the intermediate carrier body 230 to the carrier 224 and engages the carrier 224 to couple the intermediate carrier 228 to the carrier 224.

In the illustrative embodiment, the single retainer 236 extends radially outward from the intermediate carrier body 230 at a center 278 of the intermediate carrier body 230. The pins 232, 234 extend through holes 281, 283 formed in the intermediate carrier body 230 on opposite circumferential ends 280, 282 of the intermediate carrier body 230.

The retainer 236 includes a coupling 284 and a fastener 286 as shown in FIG. 8. The coupling 284 is integrally formed with the intermediate carrier body 230 at the center 278 of the intermediate carrier body 230 and extends radially outward from the intermediate carrier body 230. The fastener 286 extends radially inward through the corresponding hole formed in an outer wall 248 of the carrier 224 and into the corresponding coupling 284. The fasteners 286 are tightened to bring the attachment portion 266 into contact with locating pads 240 formed in the outer wall 248 of the carrier 224.

The locating pads 240 contact the radially-outwardly facing surface 274 of the attachment portion 266 to radially locate the blade track segment 226 relative to the carrier 224.

The second locating pad 240 is spaced circumferentially apart from the first locating pad 240 such that the locating pads 240 contact the attachment portion 266 at two circumferential locations as shown in FIG. 8.

In the illustrative embodiment, the carrier 224 is also shaped to include orientation features 244, 246 that engage the retainer 236 as shown in FIG. 8. The orientation features 244, 246 engage the retainer 236 on opposite sides to orientate the intermediate carrier body 230 relative to the carrier 224.

Figure 9:
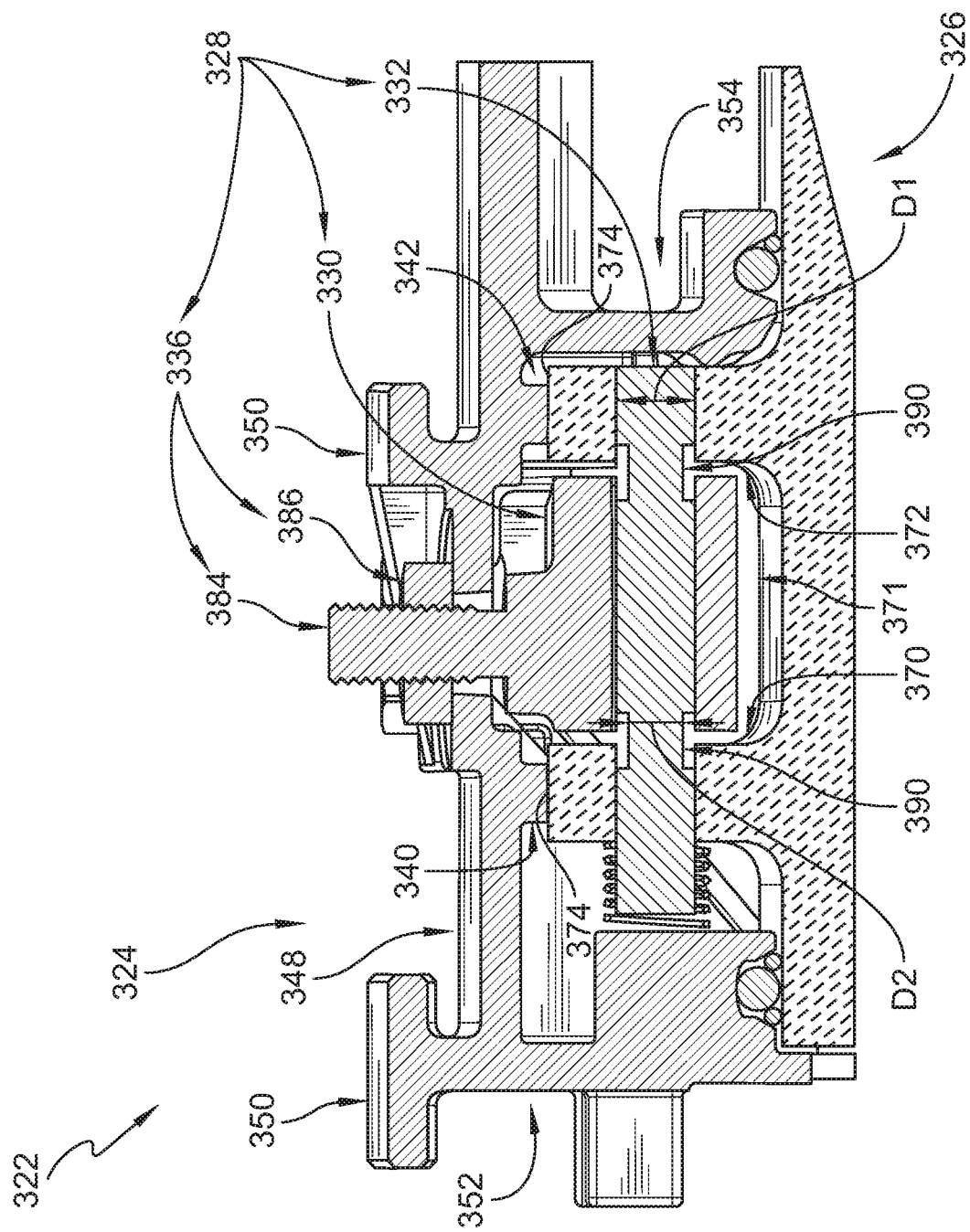
FIG. 9 is a cross-section view of another embodiment of a turbine shroud assembly adapted for use in the gas turbine engine of FIG. 1 showing the turbine shroud assembly includes a plurality of stepped pins that extend axially through portions of the blade track segment and the intermediate carrier.
Figure 10:
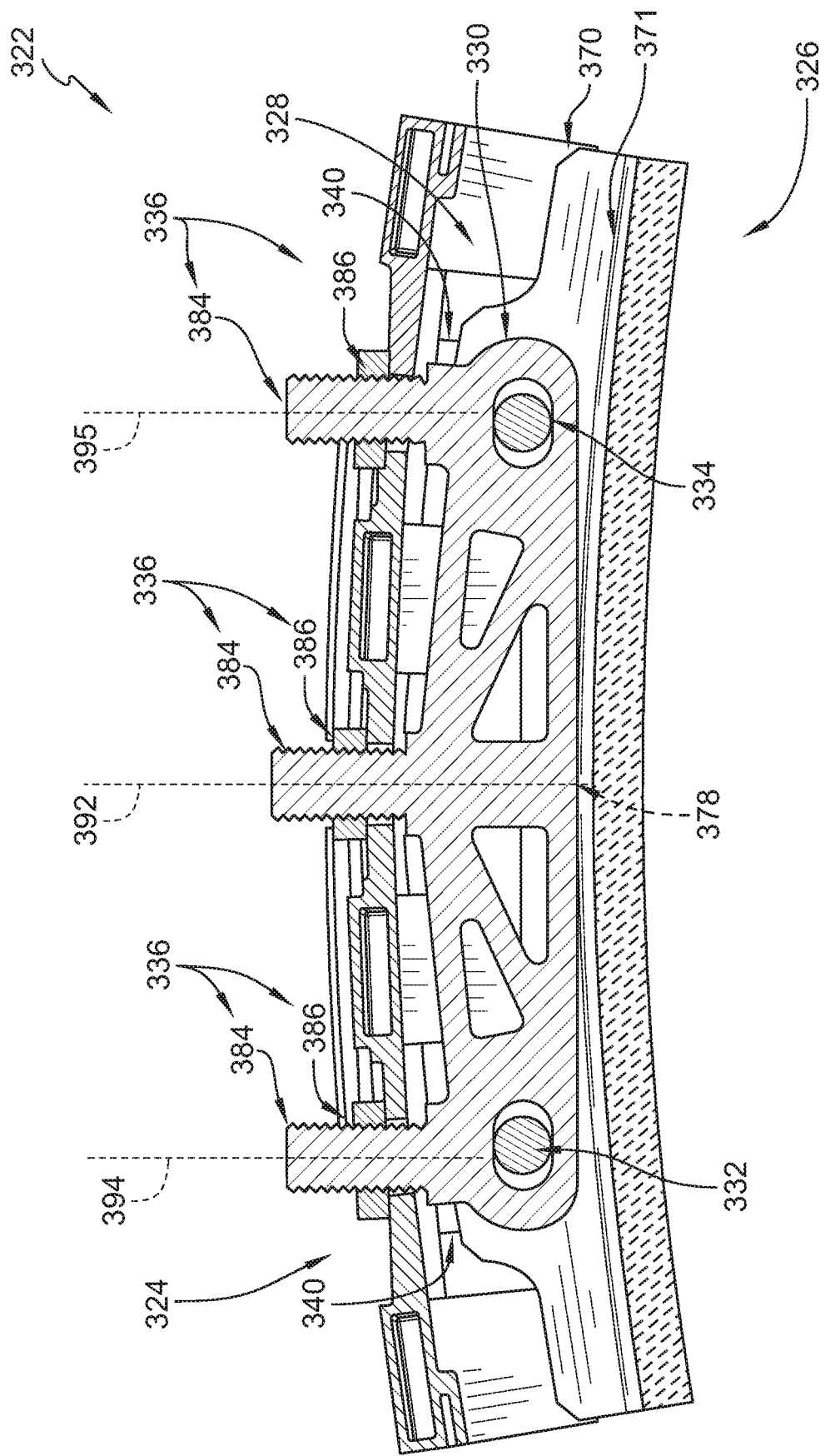
FIG. 10 is a cross-section view of the turbine shroud assembly of FIG. 9 showing retainers of the intermediate carrier are each formed by a shaft that extends outward from an intermediate carrier body through the carrier and a fastener nut that mates with the corresponding shaft radially outward of the carrier to couple the intermediate carrier to the carrier.
Figure 11:
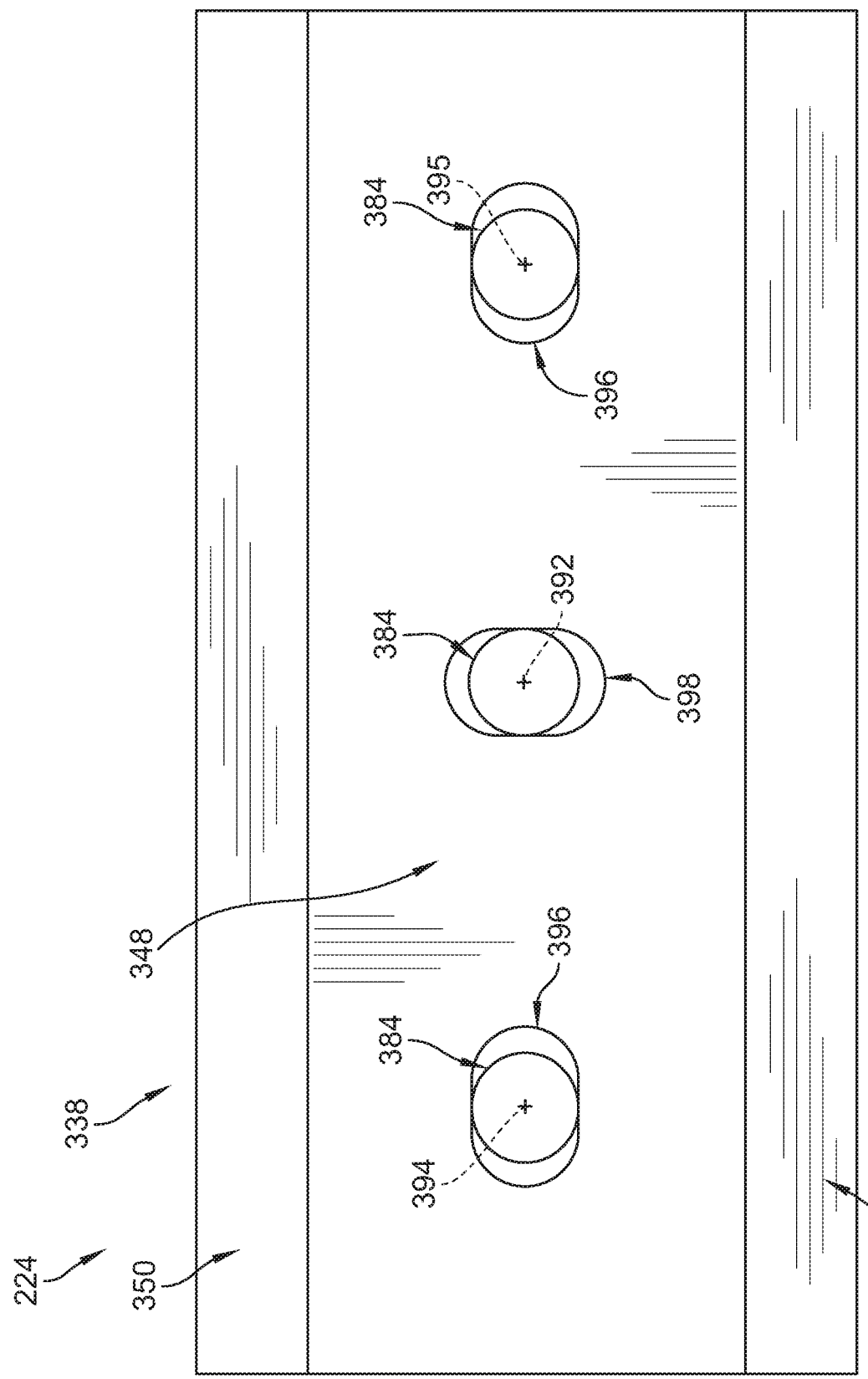
FIG. 11 is a top plan view of the turbine shroud assembly of FIG. 10 as viewed radially inward to an axis of the assembly and showing the carrier includes an outer wall that is shaped to include a plurality of holes that are sized to receive the shafts of the retainers while allowing for machine tolerances.

Another embodiment of a turbine shroud segment 322 in accordance with the present disclosure is shown in FIGS. 9-11. The turbine shroud segment 322 is substantially similar to the turbine shroud segment 22 shown in FIGS. 1-7 and described herein. Accordingly, similar reference numbers in the 300 series indicate features that are common between the turbine shroud segment 22 and the turbine shroud segment 322. The description of the turbine shroud segment 22 is incorporated by reference to apply to the turbine shroud segment 322, except in instances when it conflicts with the specific description and the drawings of the turbine shroud segment 322.

The turbine shroud segment 322 includes a carrier 324, a blade track segment 326, and an intermediate carrier 328 as shown in FIGS. 9-11. The carrier 324 includes a carrier body 338 and a plurality of locating pads 340, 342 that each extend radially inward from the carrier body 338. The intermediate carrier 328 is configured to couple the blade track segment 326 to the carrier 324 and bring the plurality of locating pads 340, 342 into contact with a radially-outwardly facing surface 374 of the blade track segment 326 to radially locate the blade track segment 326 relative to the carrier 324.

The intermediate carrier 328 includes an intermediate carrier body 330, two pins 332, 334, and a plurality of retainers 336 as shown in FIGS. 9-11. The intermediate carrier body 330 is arranged axially between fore and aft mount posts 370, 372 of the blade track segment 326 in a channel 371. The pins 332, 334 extend axially through the mount posts 370, 372 of the blade track segment 326 and the intermediate carrier body 330 to couple the blade track segment 326 to the intermediate carrier body 330. The retainers 336 extend outward from the intermediate carrier body 330 to the carrier 324 and engage the carrier 324 to couple the intermediate carrier 328 to the carrier 324.

Each retainer 336 includes a stud 384 and a fastener nut 386 as shown in FIGS. 9-11. The stud 384 is integrally formed with the intermediate carrier body 330 and extends outward from the intermediate carrier body 330 through slots 396, 398 formed in the carrier 324. The fastener nut 386 mates with corresponding threads included in the stud 384 radially outward of the carrier 324 to couple the intermediate carrier 328 with the carrier 324.

In the illustrative embodiment, the center stud 384 extends along an axis 392 that extends radially outward from the intermediate carrier body 330 at a center 378 of the intermediate carrier body 330 as shown in FIG. 10. The other two studs 384 extend outward from the intermediate carrier body 330 along axes 394, 395 that are parallel with the axis 392 of the center stud 384. Rather than each stud 384 extending radially outward from the body 330 with respect to the axis 11, the two studs 384 spaced circumferentially apart from the center stud 384 extend along axes 394, 395 that are parallel to the center axis 392 simplifying attachment of the intermediate carrier 328 to the carrier 324.

The carrier body 338 includes an outer wall 348, hangers 350, and fore and aft radial walls 352, 354 as shown in FIGS. 9 and 11. The outer wall 348 extends circumferentially partway about the axis 11 and is shaped to include the slots 396, 398 that are sized to receive the retainers 336 of the intermediate carrier 328. The hangers 350 extend radially outward from the outer wall 348 and engage the case 19 to couple the turbine shroud segment 322 to the rest of the engine 10. Each of the fore and aft radial walls 352, 354 extend radially inward from the outer wall 348 on opposite axial ends of the outer wall 348.

The slots 396, 398 formed in the outer wall 348 of the carrier 324 include circumferentially-elongated slots 396 and a center slot 398 as shown in FIG. 11. The second circumferentially-elongated slot 396 is spaced apart circumferentially from the first circumferentially-elongated slot 396. The center slot 398 is an axially-elongated slot 398 that is located circumferentially between the first circumferentially-elongated slot 396 and the second circumferentially-elongated slot 396. Each of the slots 396, 398 extend radially through the outer wall 348, but have one of a circumferential and axial component that allows movement of the stud 384 relative to the carrier 324 in the illustrative embodiment.

In the illustrative embodiment, the first and second circumferentially-elongated slots 396 extend circumferentially at least partway through the outer wall 348 of the carrier 324 to allow the corresponding retainers 336 to move circumferentially relative to the carrier 324. However, the circumferentially-elongated slots 396 are sized to block axial movement of the corresponding retainer 336 relative to the carrier 324.

In the illustrative embodiment, the axially-elongated slot 398 extends axially at least partway through the outer wall 348 of the carrier 324 to allow the corresponding retainer 336 to move axially relative to the carrier 324. However, the axially-elongated slot 398 is sized to block circumferential movement of the corresponding retainer 336 relative to the carrier 324.

In other embodiments, the center slot 398 is a round hole rather than an axially-elongated slot. The center slot 398 may be oversized relative to the retainer 336 to account for the tolerances of the slots 396, 398.

In the illustrative embodiment, the pins 332, 334 are shaped to include tapered portions 390 are shown in FIG. 9. The pins 332, 334 have a first diameter D1 that is sized to fit into the respective pin holes in the mount posts 370, 372 and intermediate carrier body 330, while the tapered portions 390 have a second diameter D2 that is smaller than the first diameter of the pins 332, 334. The tapered portions 390 help reduce stress in the pins 332, 334.

Another method for assembling the turbine shroud segment 322 may include several steps. The method begins by arranging the intermediate carrier body 330 axially between the first mount post 370 and the second mount post 372 so that the pin holes formed in the intermediate carrier body 30 align with the pin holes in both the first mount post 370 and the second mount post 372.

After arranging the intermediate carrier body 330 between the mount posts, 370, 372, the pins 332, 334 are each inserted through the first mount post 370, the intermediate carrier body 330, and the second mount post 372. With the intermediate carrier body 330 assembled with the blade track segment 326, the assembled components are arranged in the carrier 324 such that each stud 384 of each retainer 336 aligns with the corresponding slot 396, 398. The studs 384 are then inserted through the slots 396, 398, which correctly orientate the blade track segment 326 relative to the carrier 324.

The fasteners nuts 386 are then coupled to each stud 384 and tightened to bring the radially-outward facing surface 374 of both mount posts 370, 372 into contact with the locating pads 340, 342. In the illustrative embodiment, the slots 396, 398 help guide the intermediate carrier body 330 to the correct position so that the locating pads 340, 342 contact the surface 374 of the blade track segment 326 in the correct position.

The present disclosure relates to a method/arrangement for supporting and sealing a ceramic matrix composite (CMC) blade track segment 26, 226, 326 with an inverted Greek letter Pi shape as shown in FIGS. 2-6 and 9. The turbine shroud segment 22, 222, 322 includes an intermediate carrier 28, 228, 328 that uses axial pins 32, 34, 232, 234, 332, 334 and an intermediate carrier body 30, 230, 330 for radial support to couple the blade track segment 26, 226, 326 to the carrier 24, 224, 324. The blade track segment 26, 226, 326 uses the anti-rotation feature 61 on the carrier 24 for circumferential retention. The intermediate carrier 28, 228, 328 provides a mechanical attachment with a simple design that reduces the tolerance between the gas path 17 and the hangers 50, 350 on the carrier 24, 224, 324. The intermediate carrier 28, 228, 328 may also reduce stresses in the blade track segment 26, 226, 326 and reduce the number of leakage paths between the carrier 24, 224, 324 and the blade track segment 26, 226, 326.

In this invention, the blade track segment 26, 226, 326 takes the shape of an inverted Greek letter Pi, with two mount posts 70, 72, 270, 272, 370, 372 spaced apart axially. As shown in the illustrative embodiment of FIGS. 2-7, the blade track segment 26 contains two holes 67, 69 formed in the front mount post 70 that are spaced apart from one another circumferentially and two holes 67, 69 in the aft mount post 72 that are circumferentially coincident with the holes 67, 69 in the front mount post 70.

The intermediate carrier body 30 is positioned between the two mount posts 70, 72 of the blade track segment 26. The intermediate carrier body 30 is formed with two race tracked holes 81, 83, the center of each of the two holes 81, 83 being circumferentially coincident with the holes 67, 69 in the blade track segment 26.

The blade track segment 26 is then coupled to the intermediate carrier body 30 using two pins 32, 34 that are inserted thru the pin holes 67, 69 in the front mount post 70, thru the intermediate carrier body 30, and then thru the pin holes 67, 69 in the aft mount post 72. In some embodiments, the pins 32, 34 may be inserted axially aft to front as well.

In some embodiments, the pins 32, 34 may be flush or slightly sub-flush with the outer surfaces of the forward and aft mount posts 70, 72 of the blade track segment 26. In the illustrative embodiments, the pins 32, 34 need to be shorter than the distance between the forward and aft radial walls 52, 54 of the carrier 24 to allow for assembly.

Once this sub-assembly, i.e. the blade track segment 26 and the intermediate carrier 28, is together, a series of seals 88 are inserted into the metallic carrier 24 (either single or dual tandem seals in the fore radial wall 52 and a single tandem seal in the aft radial wall 54). The sub-assembly may then be radially inserted into the attachment-receiving space 39 formed in the carrier 24 and radially retained by the fasteners 86. The position of the blade track segment 26 relative to the carrier 24 is controlled by four locating pads 40, 42 (2 on the top of each the forward and aft mount post 70, 72). The locating pads 40, 42 on the inner surface of the carrier 24, control the position of the blade track segment 26 by contacting a radially-outwardly facing surface 74 of the attachment 66.

The radial position of the blade track segment 26 relative to the carrier 24 is determined by four locating pads 40, 42 on the carrier 24. In the illustrative embodiment, two locating pads 40 contact the top or surface 74 of the forward mount post 70, while two locating pads 42 contact the top or surface 74 of the aft mount post 72. The locating pads 40, 42 may take the form of simply being a tightly machined outer diameter of the forward and aft mount posts 70, 72. The fasteners 86 may be tightened only to the point where the four locating pads 40, 42 are in contact.

In the illustrative embodiment of FIG. 7, each of the three retainers 36 is radial. In the illustrative embodiment of FIG. 10, the center retainer 336 is radial and the other two retainers 336 are parallel to the center retainer 336.

In the illustrative embodiment of FIGS. 7 and 8, the retainer(s) 36, 236 are couplings 84, 284 with fasteners 86, 286 that extend through the carrier 24, 224 into the corresponding coupling 84, 284. In the illustrative embodiment of FIG. 10, the retainers 336 are replaced by either fixed or replaceable studs 384 that extend outward through the carrier 324. The center stud 384 being radial and the other two studs 384 being parallel to the center stud 384.

In such embodiments with bolts or replaceable studs, it may be desirous to use helicoils in the threaded holes in the intermediate carrier 28, 228, 328. To ensure that the bolts (or retention nuts) do not back off, a tab washer, locking threads, or other method may be used to "capture" the bolt (or nut) and keep it from loosening.

Further, the assembly 20 may include a feature such as a spring or wave washer 68. The feature 68 may be used to force the blade track segment 26 aft such that the aft mount post 72 were to contact a chordal seal 62. It is also possible that this contact could take place due to the differential pressure axially across the blade track segment 26 and no spring would be used.

Advantages of the turbine shroud segment 22, 222, 322 may include reduced leakage. The leakage may be reduced by removing axial holes in the carrier 24, 224, 324 by using radial retention on the intermediate carrier 28, 228, 328.

Other advantages may include a reduction in stack of about +/−0.09 mm (0.0035 inches). The stack reduction may help with coating thickness requirements and/or more consistent seal compression, i.e. less variability. The stack may be reduced by eliminating the number of components from the hangers 50, 350 of the carrier 24, 324 to gas path 17 and/or the seal interface in carrier 24, 324 to the seal interface on the blade track segment 26, 326.

Another advantage may include a reduction in stress in both the ceramic matrix composite blade track segment 26 and the pins 32, 34. Race tracked holes 81, 83 in the intermediate carrier 28 may help reduce stress, but an anti-rotation feature 61 may be needed. An addition of chordal seal 62 on aft mount post 72 may minimize the wear in the ceramic matrix composite material, while the "double" tandem seal 88 at leading edge of the blade track segment 26 may increase pressure margin with minimal increases in load.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly adapted for use in a gas turbine engine, the turbine shroud assembly comprising a carrier comprising metallic materials and arranged to extend circumferentially at least partway about an axis, a blade track segment comprising ceramic matrix composite materials, the blade track segment formed to include a runner shaped to extend circumferentially partway around the axis, a first mount post that extends radially outward from the runner, and a second mount post that extends radially outward from the runner, the second mount post spaced apart axially from the first mount post to define a channel therebetween, and an intermediate carrier configured to couple the blade track segment to the carrier, the intermediate carrier including an intermediate carrier body arranged axially between the first mount post and the second mount post, at least one pin that extends axially into the first mount post, the intermediate carrier body, and the second mount post to couple the intermediate carrier body to the blade track segment, and at least one retainer that extends radially outward from the intermediate carrier body through the carrier to couple the intermediate carrier and the blade track segment with the carrier.

2. The turbine shroud assembly of claim 1, wherein the carrier includes a carrier body and a plurality of locating pads that each extends radially inward from the carrier body into contact with a radially-outwardly facing surface of at least one of the first mount post and the second mount post of the blade track segment to radially locate the blade track segment relative to the carrier.

3. The turbine shroud assembly of claim 2, wherein the intermediate carrier includes a plurality of retainers that are spaced apart circumferentially along the intermediate carrier body.

4. The turbine shroud assembly of claim 3, wherein each retainer of the plurality of retainers includes a coupling formed integrally with the intermediate carrier body that extends radially outward from the intermediate carrier body and a fastener that extends radially inward through the carrier into the coupling to couple the intermediate carrier with the carrier.

5. The turbine shroud assembly of claim 3, wherein each retainer of the plurality of retainers includes a threaded shaft formed integrally with the intermediate carrier body that extends radially outward from the intermediate carrier body through the carrier and a fastener nut that mates with the threaded shaft radially outward of the carrier to couple the intermediate carrier with the carrier.

6. The turbine shroud assembly of claim 3, wherein the plurality of retainers include a center retainer that extends outward from the intermediate carrier body along a center retainer axis that extends radially relative to the axis of the gas turbine engine, a second retainer spaced apart circumferentially from the center retainer that extends outward from the intermediate carrier body along a second retainer axis, and a third retainer spaced apart circumferentially from the center retainer opposite the second retainer that extends outward from the intermediate carrier body along a third retainer axis, the second retainer axis and the third retainer axis are parallel to the center retainer axis.

7. The turbine shroud assembly of claim 6, wherein each retainer of the plurality of retainers extend through one slot included in a plurality of slots formed in the carrier, wherein the plurality of slots includes a first circumferentially-elongated slot that extends radially through the carrier, a second circumferentially-elongated slot spaced part circumferentially from the first circumferentially-elongated slot that extends radially through the carrier, and a center slot located circumferentially between the first circumferentially-elongated slot and the second circumferentially-elongated slot that extends radially through the carrier, and wherein the first and second circumferentially-elongated slots extend circumferentially at least partway through the carrier to allow the corresponding retainers to move circumferentially relative to the carrier.

8. The turbine shroud assembly of claim 1, wherein the carrier includes an outer wall that extends circumferentially partway about the axis, a first radial wall that extends radially inward from the outer wall, and a second radial wall that extends radially inward from the outer wall, the second radial wall spaced apart axially from the first radial wall to define an attachment-receiving space configured to receive the first mount post and the second mount post of the blade track segment, and wherein the second radial wall is shaped to include a chordal seal that extends circumferentially along and axially forward from the second radial wall and engages the second mount post of the blade track segment to axially locate the blade track segment.

9. The turbine shroud assembly of claim 8, wherein the carrier further includes at least one anti-rotation feature that extends axially from one of the first radial wall and the second radial wall into an anti-rotation notch formed in a corresponding mount post of the blade track segment to block circumferential movement of the blade track segment relative to the carrier.

10. The turbine shroud assembly of claim 8, wherein the outer wall of the carrier is shaped to include axial orientation tabs that extend radially inward from a radially-inwardly facing surface of the outer wall and engage the intermediate carrier on opposite axial sides of the intermediate carrier to axially align the intermediate carrier relative to the carrier so that the intermediate carrier is in a predetermined axial position relative to the carrier.

11. The turbine shroud assembly of claim 10, wherein the outer wall of the carrier is shaped to include circumferential orientation tabs that extend radially inward from the radially-inwardly facing surface of the outer wall and engage the intermediate carrier on opposite circumferential ends of the intermediate carrier to circumferentially align the intermediate carrier relative to the carrier so that the intermediate carrier is in a predetermined circumferential position relative to the carrier.

12. The turbine shroud assembly of claim 1, further comprising a bias member arranged between the first mount post of the blade track segment and the carrier and configured to bias the blade track segment axially aft.

13. A turbine shroud assembly adapted for use in a gas turbine engine, the turbine shroud assembly comprising a carrier that extends at least partway circumferentially around an axis, a blade track segment including a runner shaped to extend partway around the axis and an attachment portion that extends radially outward from the runner, and an intermediate carrier including an intermediate carrier body, a pin that extends axially into the attachment portion and the intermediate carrier body to couple the intermediate carrier body to the blade track segment, and a first retainer that extends through the carrier to couple the intermediate carrier and the blade track segment to the carrier.

14. The turbine shroud assembly of claim 13, wherein the carrier includes a carrier body and a locating pad that extends radially inward from the carrier body into contact with a radially-outwardly facing surface of the attachment portion of the blade track segment to radially locate the blade track segment relative to the carrier.

15. The turbine shroud assembly of claim 13, wherein the first retainer includes a coupling that extends radially outward from the intermediate carrier body and a fastener that extends radially inward through the carrier into the coupling to couple the intermediate carrier with the carrier.

16. The turbine shroud assembly of claim 13, wherein the first retainer includes a shaft that extends radially outward from the intermediate carrier body through the carrier and a fastener nut that mates with the shaft radially outward of the carrier to couple the intermediate carrier with the carrier.

17. The turbine shroud assembly of claim 13, wherein the carrier includes an outer wall that extends circumferentially partway about the axis, a first radial wall that extends radially inward from the outer wall, and a second radial wall that extends radially inward from the outer wall, the second radial wall spaced apart axially from the first radial wall to define an attachment-receiving space, and wherein the second radial wall is shaped to include a chordal seal that extends circumferentially along and axially forward from the second radial wall and engages the attachment portion of the blade track segment to axially locate the blade track segment.

18. The turbine shroud assembly of claim 17, wherein the outer wall of the carrier is shaped to include orientation tabs that extend radially inward from a radially-inwardly facing surface of the outer wall and engage the intermediate carrier on opposite sides of the intermediate carrier to align the intermediate carrier with the carrier.

19. The turbine shroud assembly of claim 13, further comprising a bias member arranged between the attachment portion of the blade track segment and the carrier and configured to bias the blade track segment axially aft.

20. A method comprising
providing a carrier, a blade track segment, and an intermediate carrier configured to couple the blade track segment to the carrier, the blade track segment including a runner shaped to extend partway around an axis, a first mount post that extends radially outward from the runner, and a second mount post spaced apart axially from the first mount post that extends radially outward from the runner, and the intermediate carrier including an intermediate carrier body, a pin, and a retainer,
arranging the intermediate carrier axially between the first mount post and the second mount post so that a pin hole formed in the intermediate carrier aligns circumferentially with a pin hole in the first mount post and a pin hole in the second mount post,
inserting the pin through the pin hole formed in the first mount post, the pin hole formed in the intermediate carrier, and the pin hole formed in the second mount post to couple the blade track segment to the intermediate carrier body,
arranging the intermediate carrier in an attachment space formed in the carrier, and
coupling the retainer of the intermediate carrier with the carrier.

* * * * *